(12) United States Patent
Zhang et al.

(10) Patent No.: US 11,906,680 B2
(45) Date of Patent: Feb. 20, 2024

(54) GENERALIZED INTERNAL MULTIPLE PREDICTION

(71) Applicant: SAUDI ARABIAN OIL COMPANY, Dhahran (SA)

(72) Inventors: Dongliang Zhang, Khobar (SA); Constantinos Tsingas, Dhahran (SA); Mohammed S. Mubarak, Dhahran (SA); Ferhan Y. Ahmed, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 46 days.

(21) Appl. No.: 17/538,489

(22) Filed: Nov. 30, 2021

(65) Prior Publication Data

US 2023/0168407 A1 Jun. 1, 2023

(51) Int. Cl.
*G01V 1/30* (2006.01)
*G01V 1/34* (2006.01)

(52) U.S. Cl.
CPC ............ *G01V 1/345* (2013.01); *G01V 1/30* (2013.01); *G01V 2210/1295* (2013.01);
(Continued)

(58) Field of Classification Search
CPC . G01V 1/28; G01V 1/30; G01V 1/345; G01V 1/362; G01V 1/364;
(Continued)

(56) References Cited

U.S. PATENT DOCUMENTS

| 3,418,625 A | 12/1968 | Anstey |
| 3,421,140 A | 1/1969 | Kerns |

(Continued)

FOREIGN PATENT DOCUMENTS

| CA | 2357604 A1 * | 7/2000 | ............... G01V 1/28 |
| CN | 108196304 B | 7/2019 | |

(Continued)

OTHER PUBLICATIONS

Zhaohui Du et al., Nonnegative Bounded Convolutional Sparse Learning Method for Envelope Feature Deconvolution, Nov. 2020, IEEE Transactions on Instrumentation and Measurement, vol. 69, No. 11, pp. 8666-8679 (Year: 2020).*

(Continued)

*Primary Examiner* — Mischita L Henson
(74) *Attorney, Agent, or Firm* — Osha Bergman Watanabe & Burton LLP (57) ABSTRACT

A method for determining an internal multiple attenuated seismic image is disclosed. The method includes obtaining a seismic dataset composed of a plurality of seismic traces and for each seismic trace determining an internal multiple trace based, at least in part, on a nested truncated correlation and a bounded convolution of the seismic trace with itself. The method further includes determining an internal multiple attenuated seismic trace based, at least in part, on subtracting the internal multiple trace from the seismic trace and combining the internal multiple attenuated seismic trace to form the internal multiple attenuated seismic image. A system including a seismic source, a plurality of seismic receivers, and a seismic processor for executing the method is disclosed.

11 Claims, 9 Drawing Sheets

(52) U.S. Cl.
CPC .. *G01V 2210/1425* (2013.01); *G01V 2210/60* (2013.01); *G01V 2210/74* (2013.01)

(58) Field of Classification Search
CPC ... G01V 2210/1295; G01V 2210/1425; G01V 2210/32; G01V 2210/324; G01V 2210/60; G01V 2210/74
See application file for complete search history.

(56) References Cited

U.S. PATENT DOCUMENTS

| | | | |
|---|---|---|---|
| 3,496,529 A | | 2/1970 | Anstey et al. |
| 11,536,865 B1* | | 12/2022 | Zhang .................... G01V 1/50 |
| 2002/0176605 A1 | | 11/2002 | Stafsudd et al. |
| 2003/0018436 A1 | | 1/2003 | Stark |
| 2009/0288823 A1* | | 11/2009 | Baumstein ............... G01V 1/36 166/250.16 |
| 2015/0032378 A1* | | 1/2015 | Nemeth .................. G01V 1/30 702/14 |
| 2015/0185342 A1* | | 7/2015 | van Groenestijn .... G01V 1/364 702/14 |
| 2018/0335535 A1 | | 11/2018 | Qin et al. |
| 2021/0149066 A1* | | 5/2021 | Wu ........................ G01V 1/006 |

FOREIGN PATENT DOCUMENTS

| | | | | |
|---|---|---|---|---|
| CN | 109307886 B | | 7/2020 | |
| EP | 2113792 A1 | * | 11/2009 | ............... G01V 1/28 |
| WO | WO-2018213283 A1 | * | 11/2018 | ............. G01V 1/362 |

OTHER PUBLICATIONS

Jakubowicz, Helmut, "Wave equation prediction and removal of interbed multiples"; SEG Technical Program Expanded Abstracts 1998; pp. 1527-1530; Jan. 1998 (4 pages).

Zhou, B. et al., "Multiple Suppression by a Wave-equation Extrapolation Method"; Exploration Geophysics; vol. 22, Issue 2; pp. 481-483; 1991 (3 pages).

Griffiths, Malcom et al., "Applications of interbed multiple attenuation"; The Leading Edge; vol. 30, Issue 8; pp. 906-912; Aug. 2011 (5 pages).

Dutta, Gaurav et al., "Practical strategies for interbed multiple attenuation"; SEG Technical Program Expanded Abstracts 2019; pp. 4550-4554; Aug. 2019 (5 pages).

Weglein, Arthur B et al., "An inverse-scattering series method for attenuating multiples in seismic reflection data"; Geophysics; vol. 62, Issue 6; pp. 1975-1989; Nov.-Dec. 1997 (15 pages).

Coates, R. T. et al., "Internal multiple attenuation using inverse scattering: Results from prestack 1 & 2D acoustic and elastic synthetics"; SEG Technical Program Expanded Abstracts 1996; pp. 1522-1525; Jan. 1996 (4 pages).

* cited by examiner

GENERALIZED INTERNAL MULTIPLE PREDICTION

BACKGROUND

In the oil and gas industry, seismic surveys may be used to image the subsurface and these images may be used in the search for oil and gas reservoirs. The seismic data acquired by seismic surveys must typically be processed to form an image of the subsurface. Seismic processing frequently assumes seismic data is composed of seismic waves that have propagated down into the subsurface from the surface of the earth, have been reflected once from a seismic reflector, and have propagated back to the surface of the earth where they are been detected and recorded. Seismic waves that have been reflected once from a seismic reflector are called "primary signals" or simply "primaries".

However, in addition to primaries, seismic data frequently includes seismic waves that have been reflected multiple times. In particular, seismic data may include seismic waves that have been reflected upward from a first seismic reflector, then reflected downward from a second seismic reflector at a shallower depth than the first seismic reflector, and then reflected upward from a third seismic reflector at a deeper depth than the second seismic reflector. Signals of this type are termed "multiple signals" or simply "multiples". When multiples are processed under the erroneous assumption that they are primaries fictious reflectors may appear in the resulting seismic image. Alternatively, real seismic reflectors may be masked or blurred as a result of the multiples in the seismic image.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for determining an internal multiple attenuated seismic image is disclosed. The method includes obtaining a seismic dataset composed of a plurality of seismic traces and for each seismic trace determining an internal multiple trace based, at least in part, on a nested truncated correlation and a bounded convolution of the seismic trace with itself. The method further includes determining an internal multiple attenuated seismic trace based, at least in part, on subtracting the internal multiple trace from the seismic trace and combining the internal multiple attenuated seismic trace to form the internal multiple attenuated seismic image.

In general, in one aspect, embodiments relate to a non-transitory computer readable medium storing instructions executable by a computer processor. The instructions include functionality for receiving a seismic dataset composed of a plurality of seismic traces and for each seismic trace determining an internal multiple trace based, at least in part, on a nested truncated correlation and a bounded convolution of the seismic trace with itself. The instructions further include functionality for determining an internal multiple attenuated seismic trace based, at least in part, on subtracting the internal multiple trace from the seismic trace and combining the internal multiple attenuated seismic trace to form the internal multiple attenuated seismic image.

In general, in one aspect, embodiments relate to a system including a seismic acquisition system to acquire a seismic dataset and a seismic processor. The seismic processor is configured to receive a seismic dataset composed of a plurality of seismic traces and for each seismic trace determine an internal multiple trace based, at least in part, on a nested truncated correlation and a bounded convolution of the seismic trace with itself. The seismic processor is further configured to determine an internal multiple attenuated seismic trace based, at least in part, on subtracting the internal multiple trace from the seismic trace and combine the internal multiple attenuated seismic trace to form the internal multiple attenuated seismic image.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-9, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Internal multiples are seismic signals that have been reflected three or more times from two or more distinct seismic reflectors within a subterranean region of interest. Embodiments are disclosed describing systems and methods for estimating internal seismic multiple signals and subtracting them from the observed seismic dataset to determine internal attenuated pre-stack seismic datasets. Furthermore, methods are disclosed for determining and drilling well paths based on the internal attenuated pre-stack seismic datasets.

Figure 1:
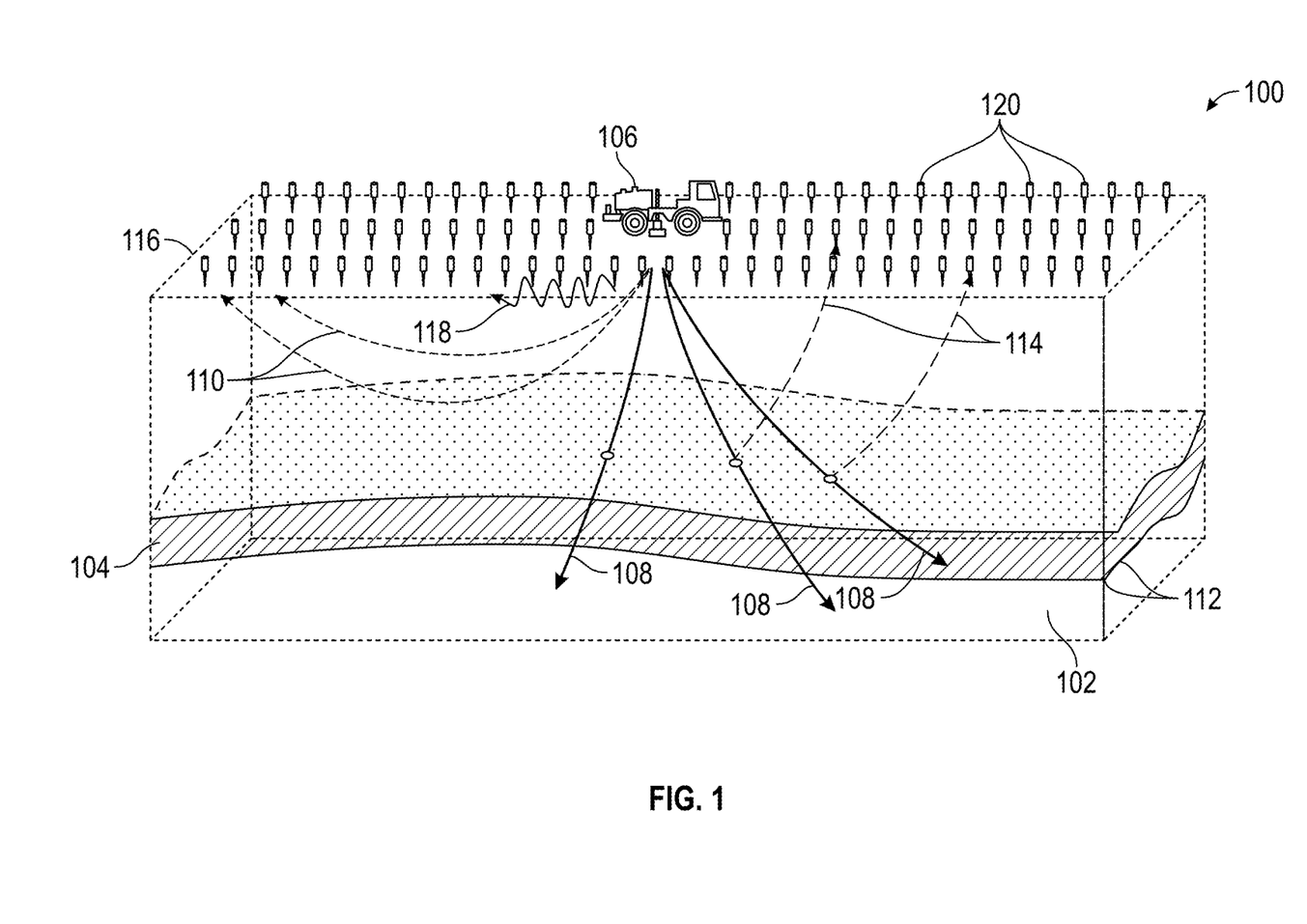
FIG. 1 depicts a seismic survey in accordance with one or more embodiments.

FIG. 1 shows a seismic survey (100) of a subterranean region of interest (102), which may contain a reservoir (104) The seismic survey (100) may utilize a seismic source (106) that generates radiated seismic waves (108). In a land environment, the seismic source (106) may be a dynamite source or one or more seismic vibrator ("vibroseis truck"). In a marine or lacustrine environment, the seismic source (106) may be an air gun. The radiated seismic waves may be recorded by a plurality of seismic receivers. A single activation of the seismic source (106) may be recorded by tens or hundreds of thousands of seismic receivers. Typically, in a land environment the seismic receiver may record the velocity or acceleration of ground-motion, while in a marine or lacustrine environment the seismic receiver may record pressure fluctuations caused by the seismic waves.

The radiated seismic waves (108) may propagate along the ground surface as surface waves ("ground-roll") (118), or the radiated seismic waves may propagate below the surface and return as refracted seismic waves (110) or may be reflected one or more times by geological discontinuities (112) and return to the surface as reflected seismic waves (114).

A seismic dataset must be processed to produce valuable information, such as one or more seismic images or one or more seismic attributes. Typically, a seismic processing workflow addresses a sequence of steps including noise attenuation, acquisition regularization, multiple identification and attenuation, seismic wave propagation velocity determination, seismic imaging, and seismic attribute determination. Several of these steps, such as seismic imaging and seismic attribute determination, require further interpretation to identify the locations within the subsurface at which hydrocarbon accumulations may be present. In some embodiments, the interpretation may occur after the generation of the post-stack seismic image or the seismic attribute. In other embodiments, the interpretation may be performed in parallel or interleaved or integrated into the process of determining the post-stack seismic image or the seismic attribute.

Figure 2A:
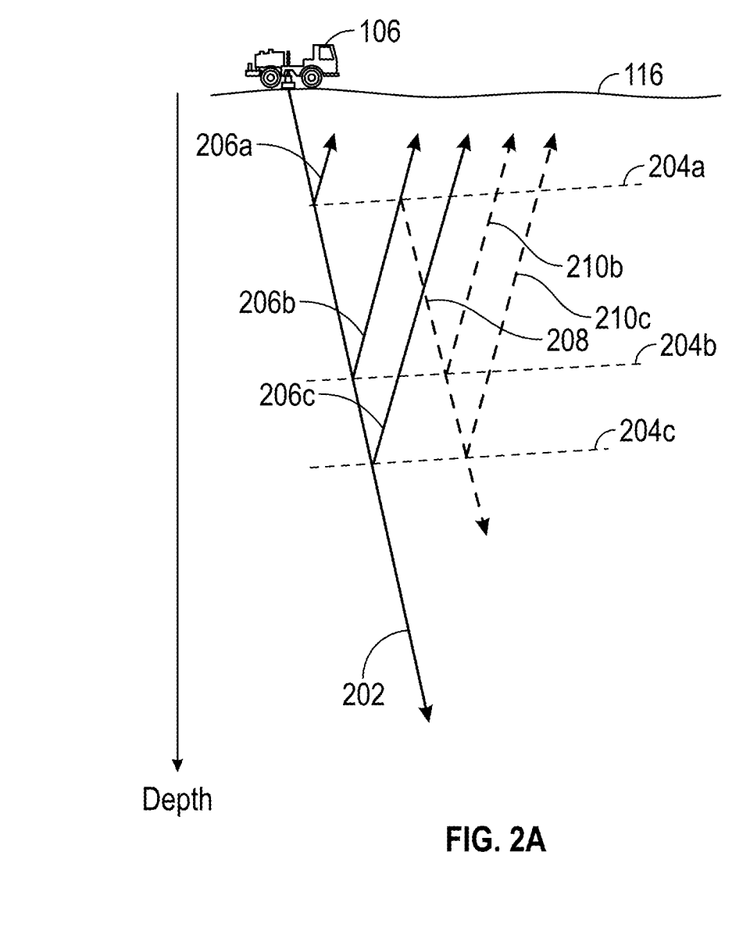
FIGS. 2A-2B depict internal multiples in accordance with one or more embodiments.

Many seismic processing methods assume that the seismic data they receive as input have only reflected once in the subsurface. However, as noted earlier, seismic waves may reflect multiple times between the seismic source (106) and the seismic receivers (120). FIG. 2A shows a schematic representation of a downward propagating seismic wave (202) propagating downward from a seismic source (106). The downward propagating seismic wave (202) may cross several geological discontinuities, such as seismic reflectors (204a, 204b, and 204 c). At each geological discontinuity (204a, 204b, and 204c) the downward propagating seismic wave (202) may generate an upward propagating reflection ("primary reflections"), such as primary reflections (206a, 206b, and 206c). The primary reflections (206a, 206b, and 206c) each contain a portion of the energy from the downward propagating seismic wave (202).

Seismic data processing methods typically assume that the seismic data they receive as input contain only primary reflections. However, upward propagating primary reflections also cross geological discontinuities, such as seismic reflector (204a). At each of these geological discontinuities the upward propagating primary reflection, such as primary reflection (206b) may generate a new downward propagating seismic wave, such as downward propagating seismic wave (208). Note, each of the other primary reflections, such as primary reflection (206c) may also generate a downward propagating seismic wave but for clarity of display these are not shown. A primary reflection may also generate a downward propagating seismic wave at more than one geological discontinuity, such as seismic reflector (204b) but for clarity of display these are not shown.

The downward propagating seismic wave, such as downward propagating seismic wave (208), may in turn cross a geological discontinuity, such as seismic reflectors (204b, 204c), where upward propagating seismic waves (210b, 210c) may be generated. Upward propagating seismic waves (210b, 210c) have been reflected multiple times and are frequently referred to as "multiple reflections" or simply "multiples".

Multiples may be divided into two types depending on where the downward reflection occurs. For "surface multiples" the downward reflection occurs at the surface of the earth (116). For "internal multiples" or "interbed" multiples, the downward reflection occurs at a geological interface below the free surface, such as seismic reflector (204a). A person of ordinary skill in the art may use internal multiple and internal multiples synonymously and, although the term internal is used herein, the scope of the invention should be interpreted to include both interbed multiples and internal multiples.

Surface multiples may be distinguished from primary reflections and partially or completely removed from seismic datasets more easily than are internal multiples, at least in part, because they may be recorded by seismic receivers at the point at which the downward propagating reflection is generated, that is at the surface of the earth (116). Internal multiples (210b, 210c) are typically not recorded at the point at which they are reflected downward, such as at seismic reflector (204a).

The amplitude of both primary reflections and internal multiples depend in part on the reflection coefficient of the seismic reflectors (e.g., 204a,20b, and 204c) from which they are generated. Typically, a reflection coefficient lies in the range 0-0.25. Thus, an internal multiple, that experiences a reflection at each of three seismic reflectors (204a, 204, and 204C), may frequently be much smaller in amplitude than the amplitude of the primary reflections from seismic reflectors (204a, 204, and 204C). Similarly, it is frequently straightforward for one of ordinary skill in the art to distinguish seismic reflectors that are likely to generate significant internal multiples based on their large primary reflection amplitudes.

Figure 2B:
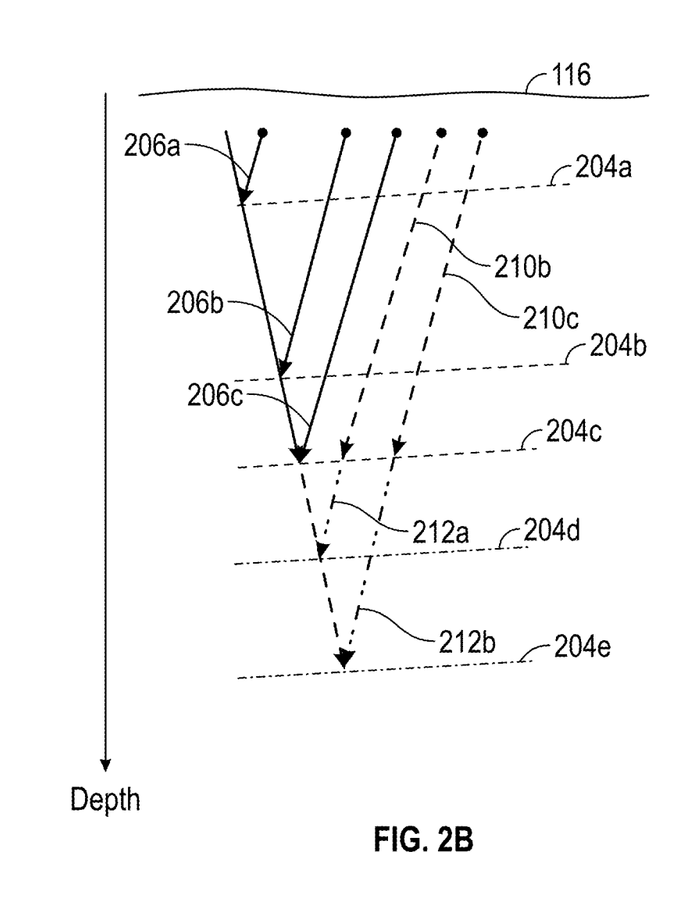

FIG. 2B depicts the erroneous results that arise when seismic processing methods that assume the seismic data they receive as input contain only primary reflections actually receive seismic data that contain primary reflections and internal multiples as input. While primary reflection (206a) generates an image of seismic reflector (204a), primary reflection (206b) generates an image of seismic reflector (204b), and primary reflection (206c) generates an image of seismic reflector (204c), internal multiples (210b, 210c) are erroneously back-propagated below (212a, 212b) to generate erroneous seismic reflectors (204d, 204e) in the post-stack seismic image. Such erroneous seismic reflectors may be misinterpreted as real seismic reflectors and may obscure real seismic reflectors, or both.

In some embodiments, the ground-roll (118), refracted seismic waves (110), and reflected seismic waves (114) generated by a single activation of the seismic source (106) are recorded by a seismic receiver (120) as a time-series representing the amplitude of ground-motion at a sequence of discrete times. This time-series may be denoted a seismic "trace". The seismic receivers (120) are positioned at a plurality of seismic receiver locations which we may denote $(x_r, y_r)$ where x and y represent orthogonal axes on the earth's surface above the subterranean region of interest (102). Thus, the refracted seismic waves (110) and reflected seismic waves (114) generated by a single activation of the seismic source (106) may be represented as a three-dimensional "3D" volume with axes D (t, $x_r$, $y_r$) where $(x_r, y_r)$ represents the location of the seismic receiver (120) and t denotes the time series at which the amplitude of ground-motion was measured. However, a seismic survey (100) may include recordings of seismic waves generated by a seismic source (106) that is positioned at a plurality of seismic source locations denoted $(x_s, y_s)$. Thus, the seismic volume for a seismic survey (100) may be represented as a five-dimensional volume, denoted D (t, $x_r$, $y_r$, $x_s$, $y_s$), where $(x_r, y_r)$ are vectors of seismic receiver locations along the x- and y-axes, and $(x_s, y_s)$ are vectors of seismic source locations along the x- and y-axes.

Figure 3A:
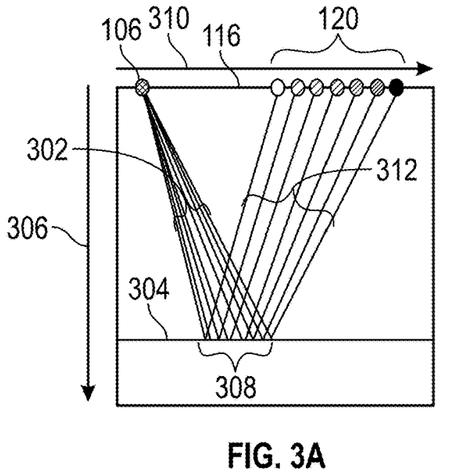
FIGS. 3A-3E show systems in accordance with one or more embodiments.

FIG. 3A depicts various stages of seismic processing, in accordance with one or more embodiments. FIG. 3A depicts seismic waves (302) radiating from a seismic source (106), reflecting from a seismic reflector (304) at a depth indicated by the vertical axis (306) and a plurality of horizontal reflection points (308), propagating as seismic reflections (312) back to the surface of the earth (116) and being recorded by an array of seismic receivers (120) covering a range of offsets (310) indicated by the horizontal axis.

Figure 3B:
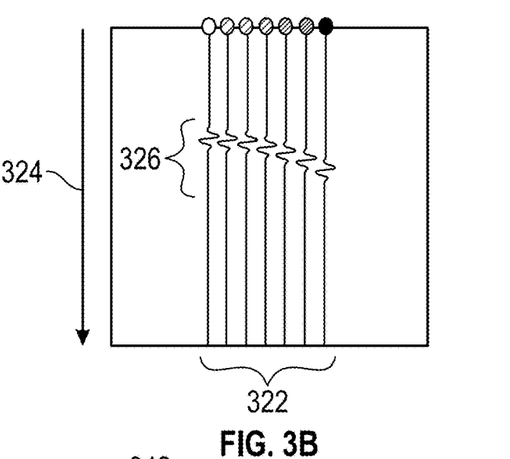

FIG. 3B shows the plurality of seismic traces (322) recorded by the array of seismic receivers (120). These seismic traces (322), originating from a single seismic source location $(\bar{x}_s, \bar{y}_s)$ maybe denoted D(t, $x_r$, $y_r$, $\bar{x}_s$, $\bar{y}_s$) and may be called a "source gather" or a "shot gather". The seismic reflections (326) may be detected on traces within a shot gather at increasing two-way travel times, indicated by the vertical axis (324), as the offset (310) of the detecting receiver increases. The phenomenon is often called "moveout".

Figure 3C:
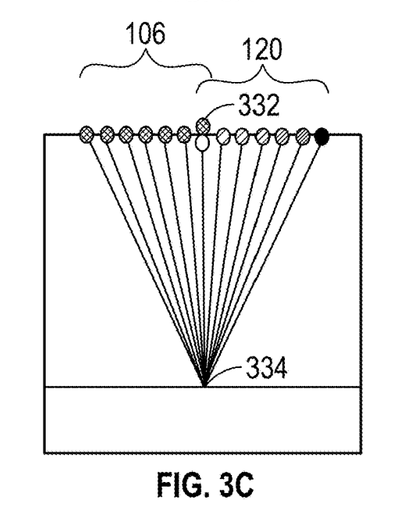

FIG. 3C shows an alternative sorting of the seismic dataset. In FIG. 3C the seismic sources (106) and the seismic receivers (120) are arranged to have a common midpoint (332). Such an arrangement may be called a "common midpoint gather". In many cases, a common midpoint gather may be more convenient than a shot gather because the reflection point of the seismic waves occurs at the same point (334) on the seismic reflector for all traces in the common midpoint gather.

Figure 3D:
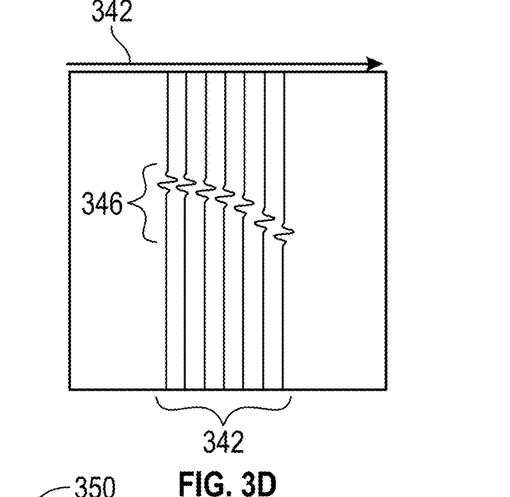

FIG. 3D shows the traces common midpoint gather (342). The traces in a common midpoint gather may be denoted D(t, $x_o+\bar{x}_m$, $y_o+\bar{y}_m$, $x_o-\bar{x}_m$, $y_o-\bar{y}_m$) where $(\bar{x}_m, \bar{y}_m)$ is the location of the midpoint and $(\bar{x}_o, \bar{y}_o)$ are vectors of offsets in the x- and y-directions. The seismic reflections (346) in a midpoint gather also exhibit two-way travel time. The two-way travel time of seismic reflections (346) may be said to form a "pre-stack horizon" (342), $t_A$ ($x_o+\bar{x}_m$, $\bar{y}_o+\bar{y}_m$, $x_o-\bar{x}_m$, $y_o-\bar{y}_m$).

Figure 3E:
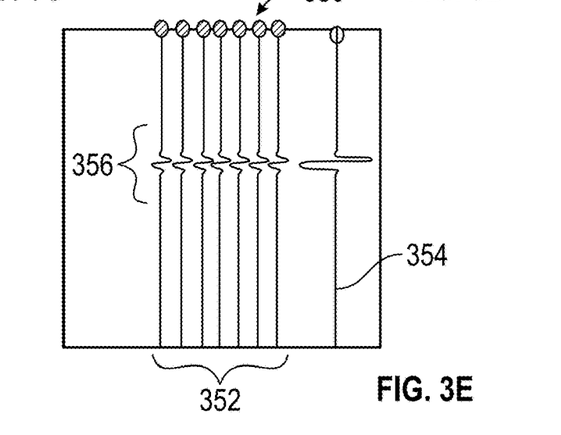

FIG. 3E shows a pre-stack midpoint gather (350) after correction for two-way travel time moveout. After correction for two-way travel time moveout all of the seismic reflections (356) from a single seismic reflector (304) arrive at the same time and the corrected seismic traces (352) may be summed ("stacked") to form a post-stack seismic trace (354). The post-stack seismic trace (354) may have a higher signal-to-noise ration than traces in the midpoint gather (342).

Figure 4A:
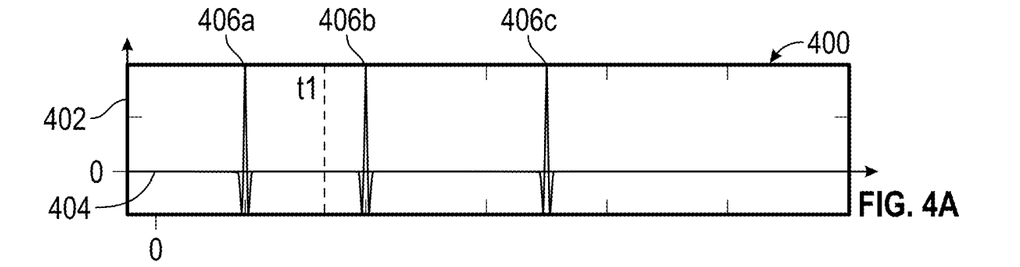
FIGS. 4A-4F depict seismic traces in accordance with one or more embodiments.
Figure 4B:
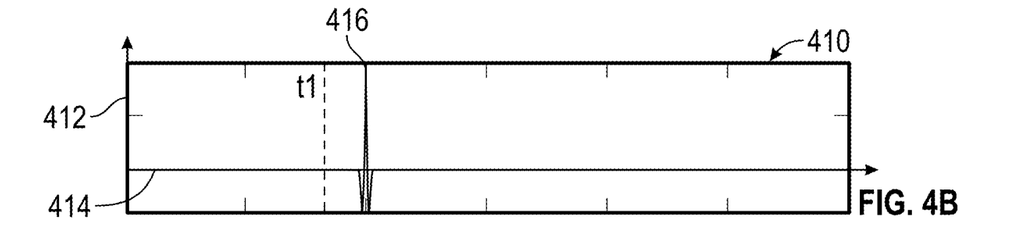

FIG. 4A shows an exemplary first time series (400), in accordance with one or more embodiments. The amplitude of the first time series (400) is indicated on a vertical axis (402) as a function of time indicated on a horizontal axis (404). The first time series (400) has three distinct pulses (406a, 406b, and 406c) at distinct times. FIG. 4B shows an exemplary second time series (410), in accordance with one or more embodiments. The amplitude of the second time series (410) is indicated on a vertical axis (412) as a function of time indicated on a horizontal axis (414). The second time series (410) has one distinct pulse or pulse (416).

Figure 4C:
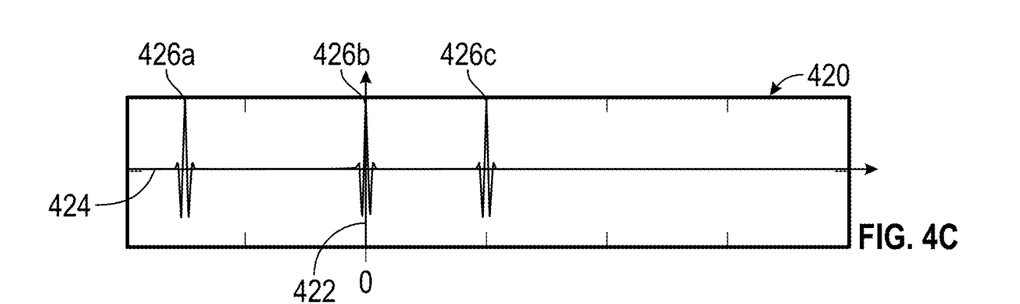

FIG. 4C shows a correlation (420) between the first time series (400) and the second time series (410), in accordance with one or more embodiments. The correlation, r, may be defined as:

$$r(\tau)=\int_{-\infty}^{\infty} d_1(t)d_2(\tau+t)dt \qquad \text{Equation (1)}$$

where $d_1$ denotes the first time series, $d_2$ denotes the second time series, t denotes time, and T denotes lag. In FIG. 4C the amplitude of the correlation is indicated on the vertical axis (422) and the lag is indicated on the horizontal axis (424) with the origin (zero point) of the lag indicated by zero ("0"). The correlation (420) has three distinct pulses (426a, 426b, and 426c) at distinct times.

Figure 4D:
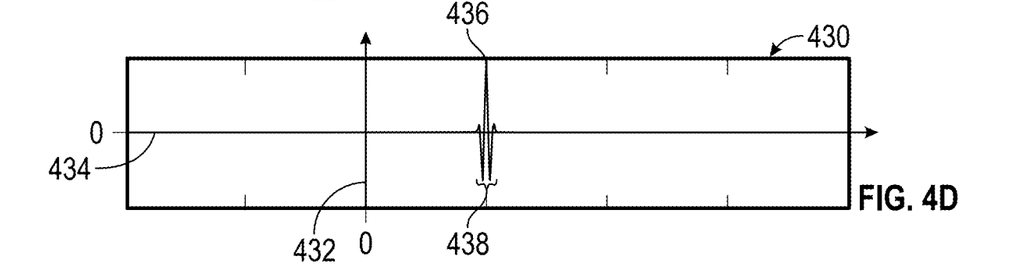

FIG. 4D shows a truncated correlation (430) between the first time series (400) and the second time series (410), in accordance with one or more embodiments. In FIG. 4D the amplitude of the truncated correlation is indicated on the vertical axis (442) and the lag is indicated on the horizontal axis (434) with the origin (zero point) of the lag indicated by zero ("0"). The limits of integration in Equation (1) are +∞ but in practice any time series is of finite duration and may be defined to begin at time zero, and only positive correlation result is required for all internal multiple prediction. The truncated correlation, tr, may be defined as:

$$tr(\tau) = \int_0^{T-\tau} d_1(t) d_2(\tau+t) dt, \tau \geq \varepsilon \qquad \text{Equation (2)}$$

where T denotes the duration of the time series. The truncated correlation (430) shown in FIG. 4D has result at lags greater than half the duration, ε, of the pulse (438). The truncated correlation (430) has just one pulse (436) at a positive lag. In particular, truncated correlation (430) has no pulses at negative or zero lags. The truncated correlation correlates pulse (416) only with earlier pulse (406a).

Figure 4E:
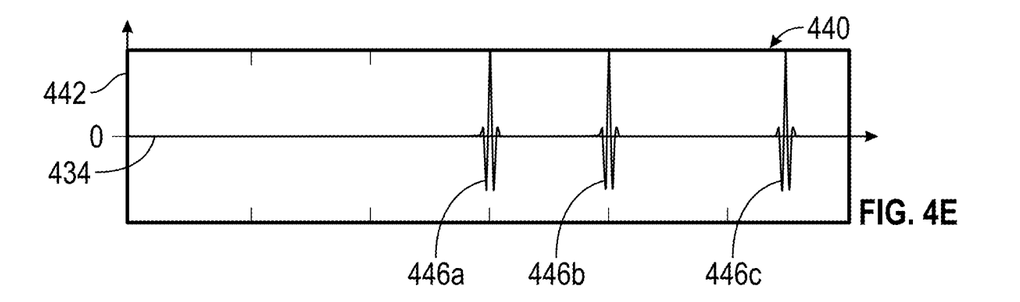

FIG. 4E shows convolution (440) between the first time series (400) and the second time series (410), in accordance with one or more embodiments. The convolution, v, may be defined as:

$$v(t) = \int_{-\infty}^{\infty} d_1(\tau) d_2(t-\tau) d\tau. \qquad \text{Equation (3)}$$

In FIG. 4E the amplitude of the convolution is indicated on the vertical axis (442) and the time is indicated on the horizontal axis (434) with the origin (zero point) of the time indicated by zero ("0"). The convolution (440) has three distinct pulses (446a, 446b, and 446c) at distinct times, that are each delayed in time relative to the corresponding pulses (406a, 406b, and 406c) in the first time series (400) by the recorded time of the pulse (416) in the second time series (410).

Equation (3) convolves pulse in FIG. 4A and FIG. 4B by each other. In accordance with one or more embodiments, only pulses later then a specified time $t_1$ are included in the convolution. Such a "bounded convolution" may be obtained by modifying Equation (3) to become:

$$v(t) = \int_{t_1}^{t-t_1} d_1(\tau) d_2(t-\tau) d\tau. \qquad \text{Equation (4)}$$

where T denotes the duration of the time series, and $t_1$ represents a specified time.

Figure 4F:
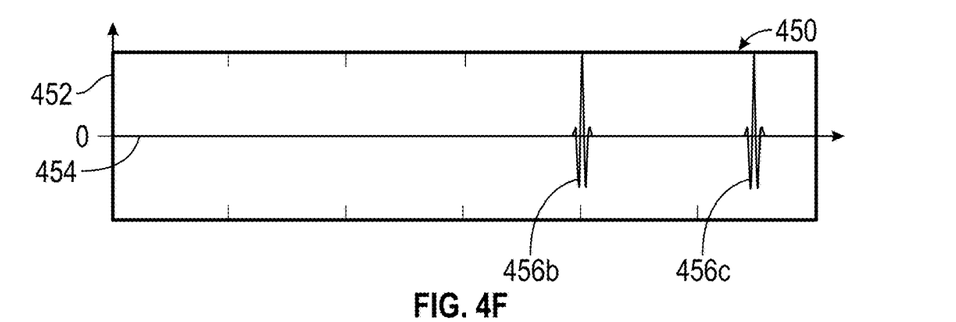

FIG. 4F illustrates the bounded convolution (450) resulting from applying Equation (4) to the first time series (400) and the second time series (410 for a $t_1$ as show in FIGS. 4A and 4B. In FIG. 4F the amplitude of the bounded convolution is indicated on the vertical axis (452) and the time is indicated on the horizontal axis (454) with the origin (zero point) of the time indicated by zero ("0"). The bounded convolution (450) has only two distinct pulses (456b, and 456c). The distinct pulse (456b) of the bounded convolution (450) is identical to the distinct pulse (446b) of the convolution (440) and the distinct pulse (456c) of the bounded convolution (450) is identical to the distinct pulse (446c) of the convolution (440). The effect of the restriction of the range of the bounded convolution to $t_1 \leq \tau \leq t - t_1$ is to remove the distinct pulse (446a) of the convolution (440) from the output of the bounded convolution (450).

Furthermore, in accordance with one or more embodiments, the shape ("wavelet") of the pulses (406a, 406b, and 406c) in the first time series (400), and the wavelet of the pulse (416) in the second time series (410) is different from the wavelet of the pulse (436) in the truncated correlation (430) or the wavelet of the pulses (446a, 446b, 446c) in the convolution (440).

Figure 5A:
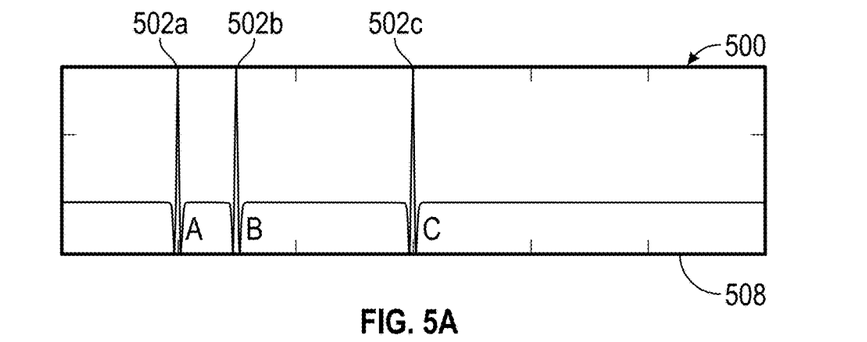
FIGS. 5A-5C depict seismic traces in accordance with one or more embodiments.

In accordance with one or more embodiments, FIG. 5A shows a schematic seismic trace (500), that may be a post-stack seismic trace (354). The seismic trace (500) may be denoted p(t) and shows three primary pulses (502a, 502b, 502c), corresponding to three seismic reflectors (204a, 204b, 204c) in the subsurface, detected a time indicated on a horizontal axis (508).

Figure 5B:
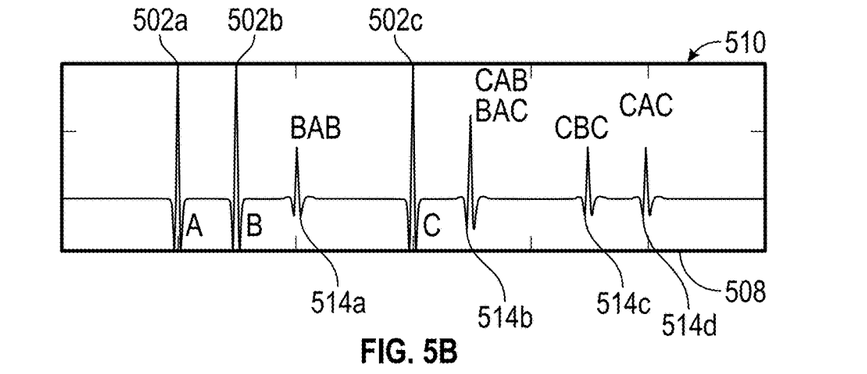

FIG. 5B shows a corresponding schematic seismic trace (510) that may be a post-stack seismic trace (354). Seismic trace (510) may be denoted d(t) contains not only the primary pulses (502a, 502b, 502c), but also the multiples (514a-d) generated by multiple reflections between the seismic reflectors (204a, 204b, 204c). For example, multiple (514a) is generated by a seismic wave that reflects at the seismic reflector that also generated primary reflection (502b), then at the seismic reflector that also generated primary reflection (502a), and finally at the seismic reflector that also generated primary reflection (502b) again. Similarly, multiple (514c) is generated by a seismic wave that reflects at the seismic reflector that also generated primary reflection (502c), then at the seismic reflector that also generated primary reflection (502b), and finally at the seismic reflector that also generated primary reflection (502c) again.

In accordance with one or more embodiments, the wavelet of the multiples (514a-d) and the primaries (502a-c) may be identical.

Figure 5C:
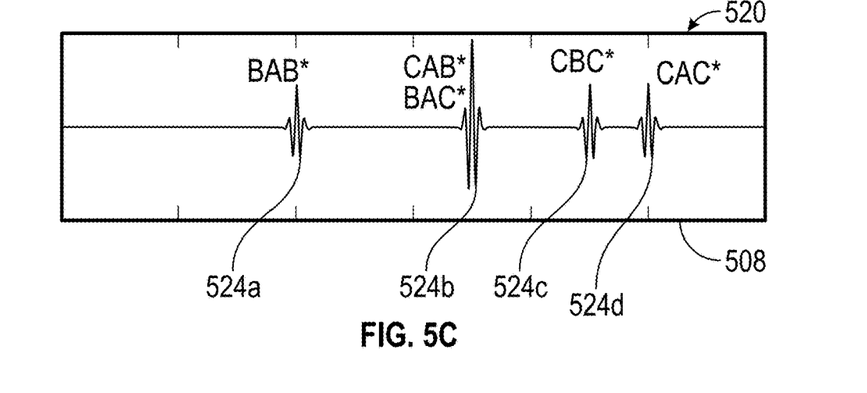

FIG. 5C shows a schematic internal multiple trace, m(t), in accordance with one or more embodiments. The internal multiple trace may be determined as:

$$m(t) = \int_0^{t-2\varepsilon} d(t_1) \{\int_{t_1+\varepsilon}^{t-\varepsilon} d(t_2) d(t+t_1-t_2) dt_2\} dt_1 \qquad \text{Equation (5)}$$

where ε denotes a duration greater or equal to half the duration of the width of the wavelet of the seismic trace (510). The internal multiple trace (520) provides an estimate of the internal multiples in the seismic trace (510). In particular, the internal multiple trace (520) contains a pulse (524a) at the same recording time as the pulse (514a) in the seismic trace (510), a pulse (524b) at the same time as the pulse (514b), and a pulse (524c) at the same time as the pulse (514c).

However, it is noteworthy that the wavelet of the pulses (524a-d) is different from the wavelet of the pulses (514a-d). In accordance with one or more embodiments, the wavelet of each of the pulses (524a-d) is equal to the wavelet of one of the pulses (514a-d) convolved with itself twice.

FIGS. 5A-5C depict one of the simplest examples of primaries and internal multiples in a seismic trace. A further simplification may arise when two of the primary pulses, e.g. (502b) and (502c), are recorded at the same time. Such a case may occur when the seismic reflector that generates (502b) and the seismic reflector that generates (502c) are the same seismic reflector. Conversely, there may typically be many more than three seismic reflectors and consequently many more than three primary pulses. The scope of the inventions is intended to include any number, N, of seismic reflectors and consequently any number, N, of primary pulse where, N≥2.

It is clear to a person of ordinary skill in the art that Equation (5) has the form of a bounded convolution within the braces "{ }" further combined with a truncated correlation. In accordance with one or more embodiments, Equation (5) may be evaluated by first evaluating a plurality of bounded convolutions for a range of values of t and $t_1$ followed by evaluating the truncated correlation. However, it will be apparent to a person of ordinary skill in the art that it is much more convenient and expeditious to evaluate the two integrations in Equation (5) simultaneously as a "nested truncated correlation and a bounded convolution" of the seismic trace with itself.

Figure 6:
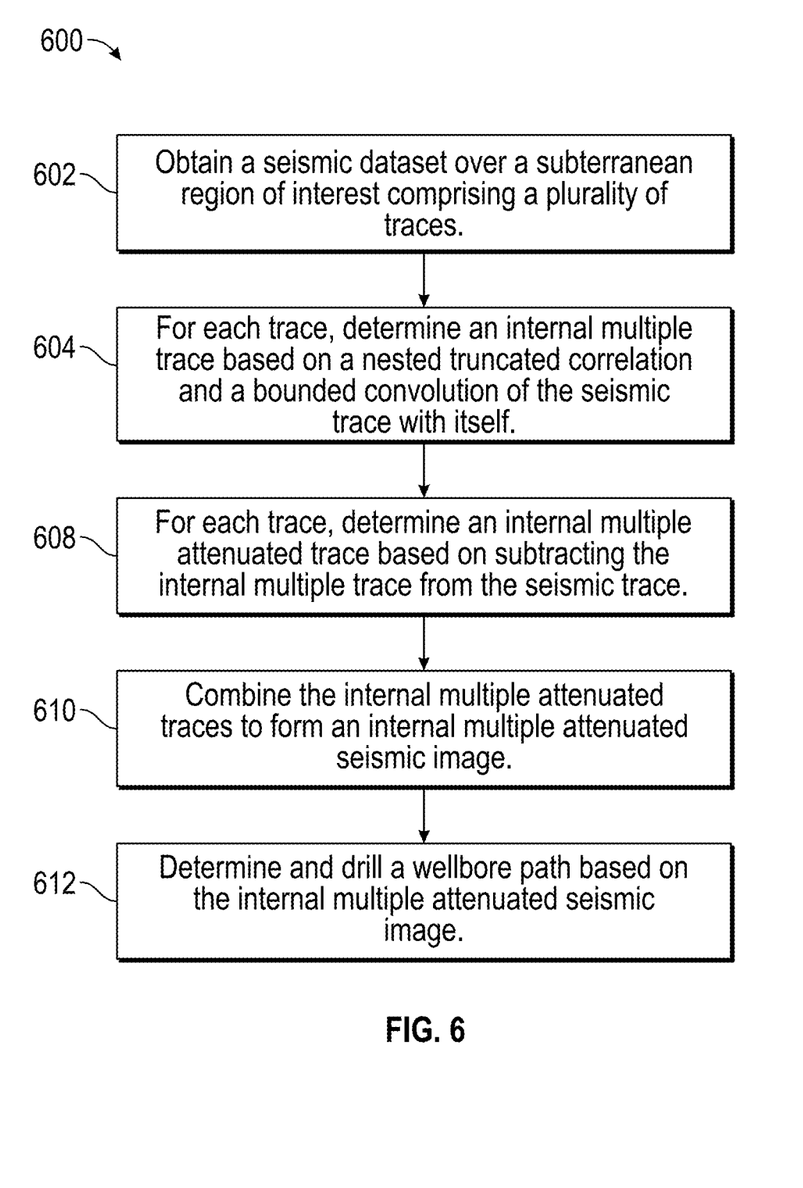
FIG. 6 depicts a flowchart in accordance with one or more embodiments.

FIG. 6 shows a flowchart (600) in accordance with one or more embodiments. In Step 602 a seismic dataset is obtained for a subterranean region of interest comprising a plurality of traces. Each of the seismic traces (510) may be a post-stack seismic trace (354). Each seismic trace (510) may contain one or more internal multiples.

For each trace, in Step 604, an internal multiple trace (520) is determined based on a nested truncated correlation and a bounded convolution of the seismic trace (510) with itself. The bounds of the integrals defining the truncated correlation and the bounded convolution may be based at least in part on the width of the wavelet of the pulses (502*a-c*, 514*a-d*). In accordance with one or more embodiments the nested truncated correlation and bounded convolution are calculated simultaneously with the results of predicting all the internal multiples at once. In the case where the seismic trace (510) only contains primaries the nested truncated correlation and bounded convolution predicts only first-order internal multiples, i.e., multiples made up of two upward reflections and one downward reflection. However, in the case where the seismic trace (510) contains primaries and internal multiples the nested truncated correlation and bounded convolution may predict all orders of internal multiples, i.e., first-order multiples and multiples made up of three upward and two downward reflections, four upward reflections and three downward reflections, and so forth ad infinitum.

In Step 608, in accordance with one or more embodiments, an internal multiple attenuated trace may be determined based on subtracting the internal multiple trace (520) from the seismic trace (510). The subtracting may include an adaptive subtracting where the internal multiple trace (520) is scaled, or filtered, or both prior to subtracting to enhance the attenuation of the internal multiples in the resulting internal multiple attenuated trace. The subtracting may include a double deconvolution of a wavelet determined from the seismic trace (510) prior to the subtraction. The subtracting may include match filtering the internal multiple trace (520) so a wavelet of the internal multiple trace (520) matches, or approximately matches a wavelet of the seismic trace (510) prior to subtracting the match filtered internal multiple trace from the seismic trace (510).

In Step 610, a plurality of internal multiple attenuated seismic traces may be combined to form an internal multiple attenuated seismic image. An example of an internal multiple attenuated seismic image is shown in FIG. 7C.

In Step 612, a wellbore path based on the internal multiple attenuated seismic image may be determined and drilled. The wellbore path may be determined to penetrate a hydrocarbon reservoir, for the purpose of characterizing the hydrocarbon reservoir, or for producing hydrocarbons, or both.

Figure 7A:
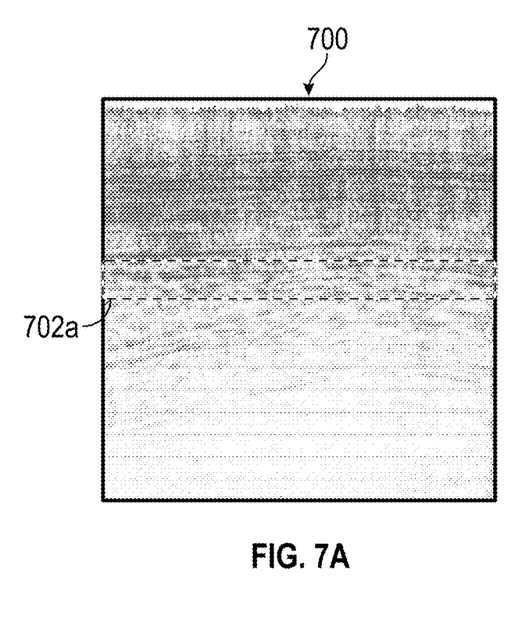
FIGS. 7A-7C depict seismic datasets in accordance with one or more embodiments.

FIG. 7A shows a seismic image (700) that may be a post-stack seismic image. The horizontal axis depicts horizontal position in the earth. The vertical axis may depicts recording time or may depict depth. The amplitude of seismic reflectors as a function of position within the seismic image (700) is depicted on a grayscale (not shown). The box (702*a*) emphasizes an area of interest within the seismic image (700) where a seismic reflector may be erroneously predicted in the seismic image (700) due the presence of an internal multiple in the seismic data acquired by a seismic survey (100).

Figure 7B:
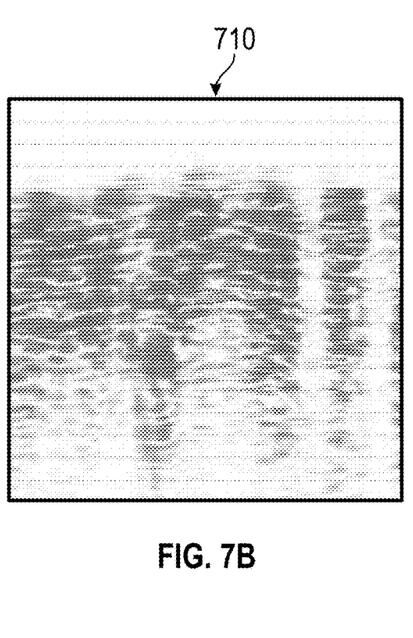
Figure 7C:
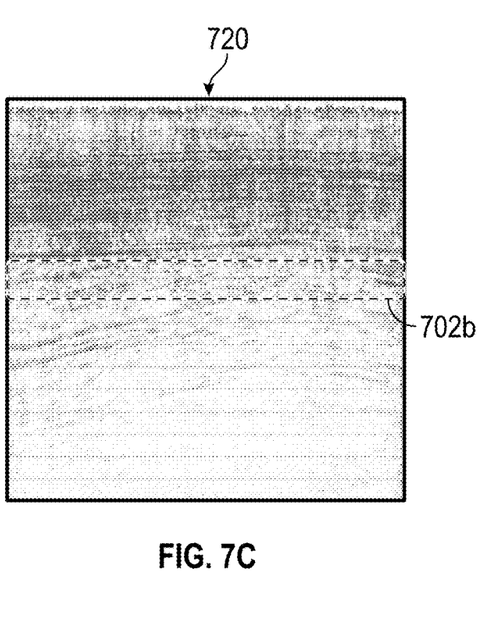

FIG. 7B shows an internal multiple seismic image (710) containing seismic reflectors predicted by the method of flowchart (600) to be erroneously present due to internal multiples in the seismic traces (510). FIG. 7C shows an internal multiple attenuated seismic image (720) obtained by adaptively subtracting the internal multiple seismic image (710) from the seismic image (700). FIG. 7C further shows the box (702*b*). A person of ordinary skill in the art will appreciate from a comparison of the contents of box (702*a*) and box (702*b*) that an erroneously predicted seismic reflector present in the seismic image (700) is no longer predicted in the internal multiple attenuated seismic image (720).

Figure 8:
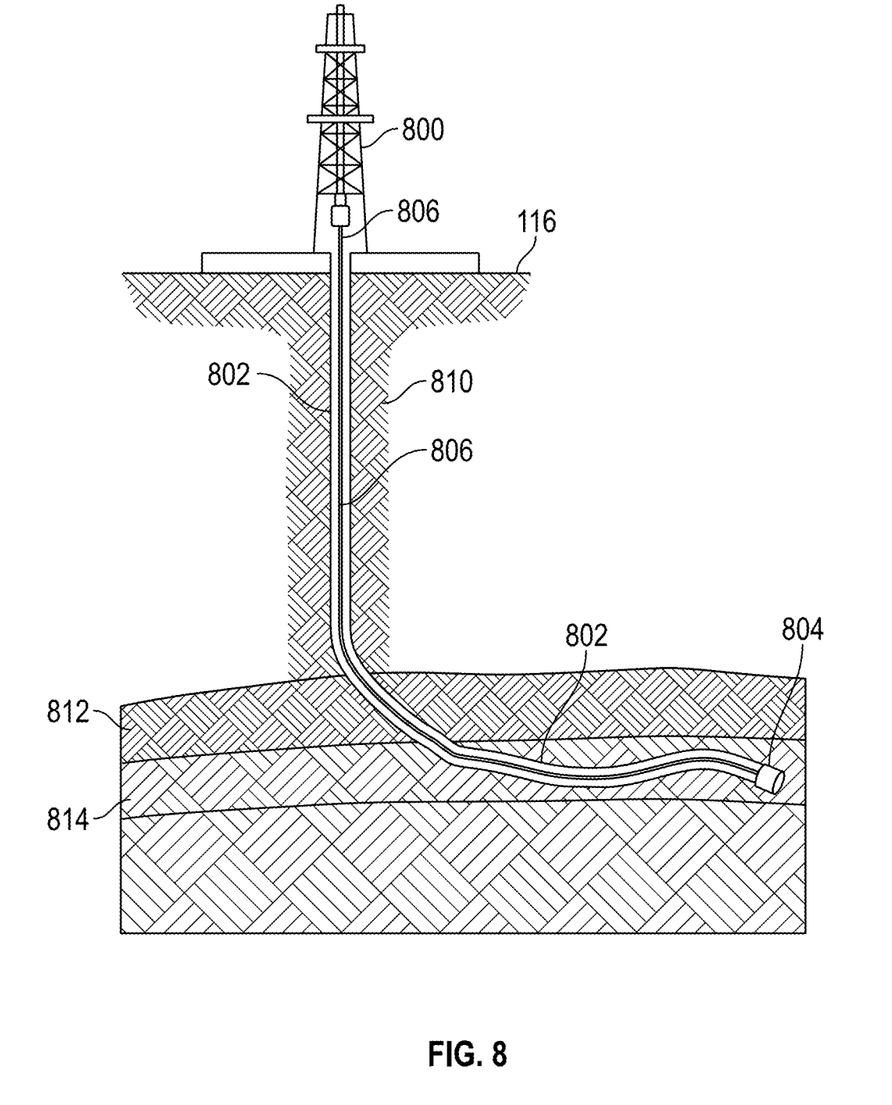
FIG. 8 depicts a drilling system in accordance with one or more embodiments.

FIG. 8 illustrates systems in accordance with one or more embodiments. As shown in FIG. 8, a well path (802) may be drilled by a drill bit (804) attached by a drill string (806) to a drill rig (800) located on the surface of the earth (116). The well may traverse a plurality of overburden layers (810) and one or more cap-rock layers (812) to a hydrocarbon reservoir (814). In accordance with one or more embodiments, the internal multiple attenuated pre-stack seismic dataset may be used to plan and drill a well path (802). The well path (802) may be a curved well path, or a straight well path. All or part of the well path (802) may be vertical.

Figure 9:
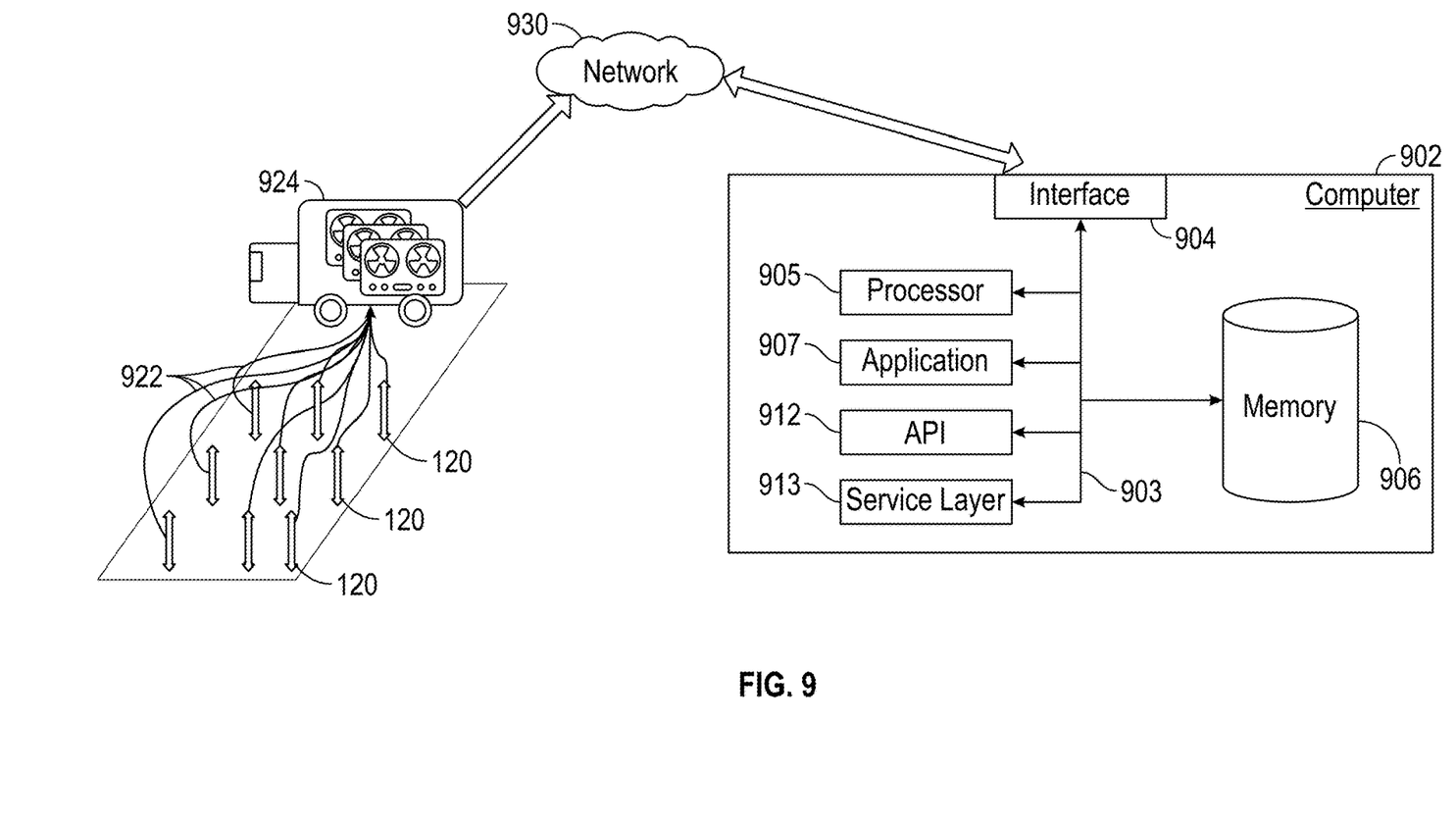
FIG. 9 depicts a computer system in accordance with one or more embodiments.

FIG. 9 shows a seismic recording and processing system, in accordance with one or more embodiments. The data recorded by a plurality of seismic receivers (120) may be transmitted to a seismic recording facility (924) located in the neighborhood of the seismic survey (100). The seismic recording facility may be one or more seismic recording trucks. The plurality of seismic receivers (120) may be in digitally or analogic telecommunication with the seismic recording facility (924). The telecommunication may be performed over telemetry channels (922) that may be electrical cables, such as coaxial cables, or may be performed wireless using wireless systems, such as Wi-Fi or Bluetooth. Digitization of the seismic data may be performed at each seismic receiver (120), or at the seismic recording facility (924), or at an intermediate telemetry node (not shown) between the seismic receiver (120) and the seismic recording facility (924).

The seismic data may be recorded at the seismic recording facility (924) and stored on non-transitory computer memory. The computer memory may be one or more computer hard-drives, or one or more computer memory tapes, or any other convenient computer memory media familiar to one skilled in the art. The seismic data may be transmitted to a computer (902) for processing. The computer (902) may be located in or near the seismic recording facility (924) or may be located at a remote location, that may be in another city, country, or continent. The seismic data may be transmitted from the seismic recording facility (924) to a computer (902) for processing. The transmission may occur over a network (930) that may be a local area network using an ethernet or Wi-Fi system, or alternatively the network (930) may be a wide area network using an internet or intranet service. Alternatively, seismic data may be transmitted over a network (930) using satellite communication networks. Most commonly, because of its size, seismic data may be transmitted by physically transporting the computer memory, such as computer tapes or hard drives, in which the seismic data is stored from the seismic recording facility (902) to the location of the computer (902) to be used for processing.

FIG. 9 further depicts a block diagram of a computer system (902) used to provide computational functionalities associated with described algorithms, methods, functions, processes, flows, and procedures as described in this disclosure, according to one or more embodiments. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904) includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method for determining an internal multiple attenuated seismic image, comprising:
    obtaining a seismic dataset, wherein the seismic dataset comprises a plurality of seismic traces;
    for each of the plurality of seismic traces, using a computer processor:
        determining an internal multiple trace based, at least in part, on a nested truncated correlation and a bounded convolution of the seismic trace with itself, and
        determining an internal multiple attenuated seismic trace based, at least in part, on subtracting the internal multiple trace from the seismic trace;
    combining, using the computer processor, the internal multiple attenuated seismic trace determined for each of the plurality of seismic traces to form the internal multiple attenuated seismic image;
    planning a wellbore path based, at least in part, on the internal multiple attenuated seismic image; and
    drilling the wellbore path.

2. The method of claim 1, wherein the seismic dataset comprises a post-stack dataset.

3. The method of claim 1, wherein the bounded convolution comprises a bounded integral with bounds based, at least in part, on a width of a wavelet of the seismic trace.

4. The method of claim 3, wherein the truncated correlation comprises a bounded integral with bounds based, at least in part, on the width of the wavelet of the seismic trace.

5. The method of claim 1, wherein subtracting the internal multiple trace comprises an adaptive subtraction.

6. The method of claim 1, wherein subtracting the internal multiple trace comprises matching filtering the internal multiple trace.

7. A system for determining an internal multiple attenuated seismic image, comprising:
    a seismic acquisition system configured to acquire a seismic dataset; and
    a computer processor configured to:
        receive a seismic dataset, wherein the seismic dataset comprises a plurality of seismic traces,
        for each of the plurality of seismic traces:
            determine an internal multiple trace based, at least in part, on a nested truncated correlation and a bounded convolution of the seismic trace with itself; and
            determine an internal multiple attenuated seismic trace based, at least in part, on subtracting the internal multiple trace from the seismic trace;
        combine, using the computer processor, the internal multiple attenuated seismic trace determined for each of the plurality of seismic traces to form the internal multiple attenuated seismic image, and
        plan a wellbore path based, at least in part, on the internal multiple attenuated seismic image; and
    a drilling system configured to drill the wellbore path.

8. The system of claim 7, wherein the bounded convolution comprises a bounded integral with bounds based, at least in part, on a width of a wavelet of the seismic trace.

9. The system of claim 8, wherein the truncated correlation comprises a bounded integral with bounds based, at least in part, on the width of the wavelet of the seismic trace.

10. The system of claim 7, wherein subtracting the internal multiple trace comprises an adaptive subtraction.

11. The system of claim 7, wherein subtracting the internal multiple trace comprises matching filtering the internal multiple trace.

* * * * *